UNITED STATES PATENT OFFICE.

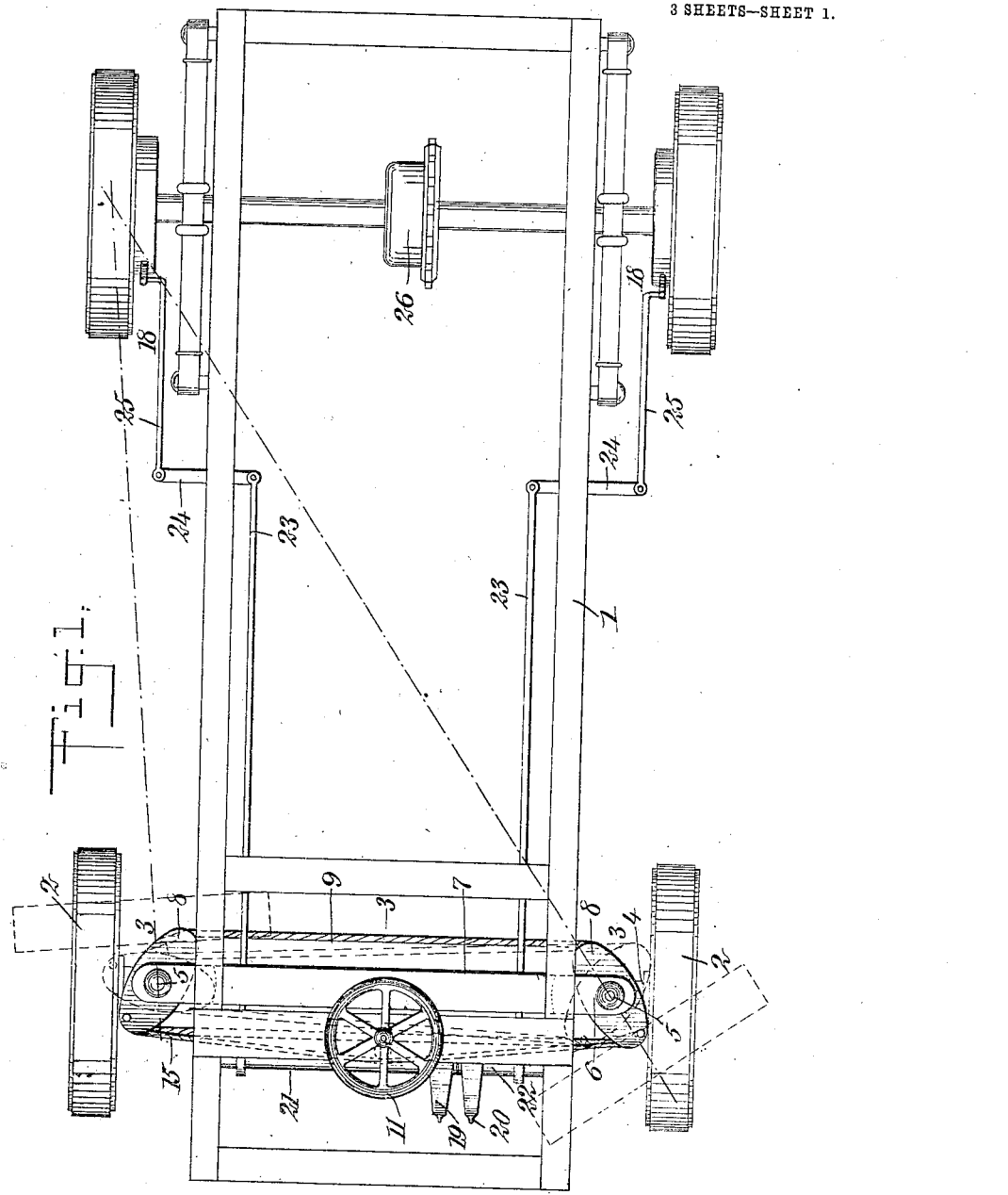

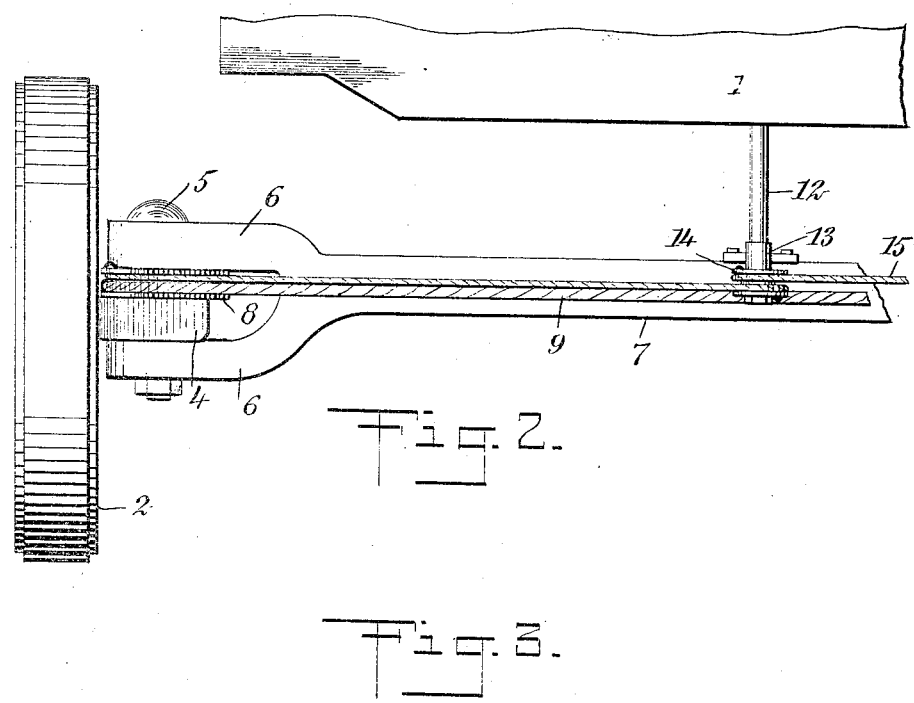
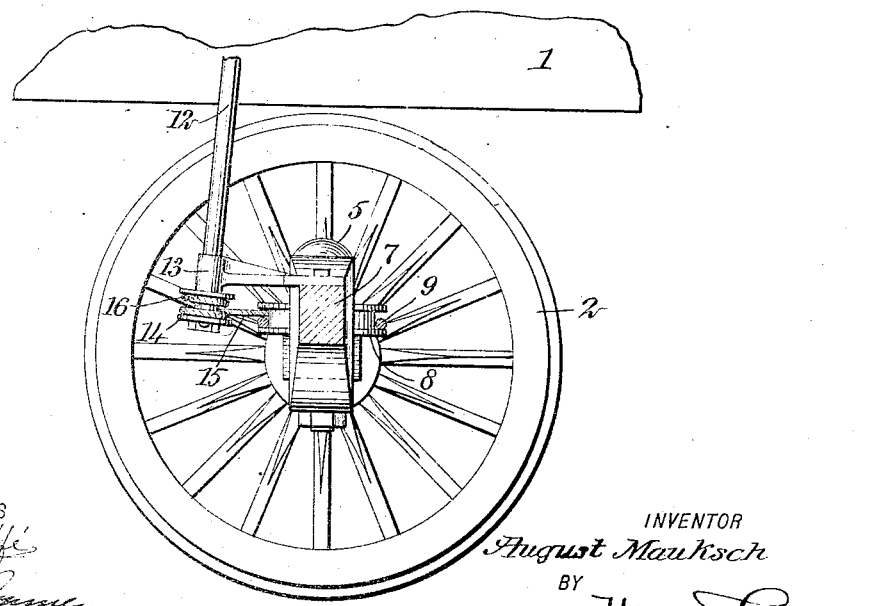

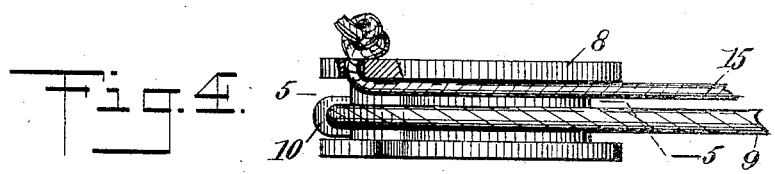
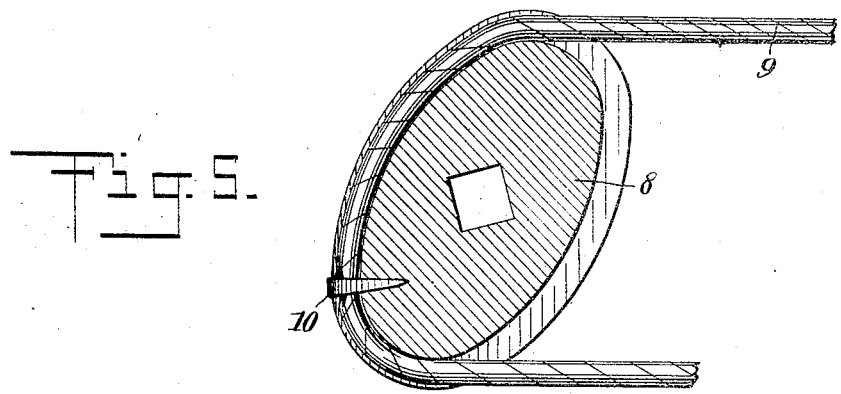
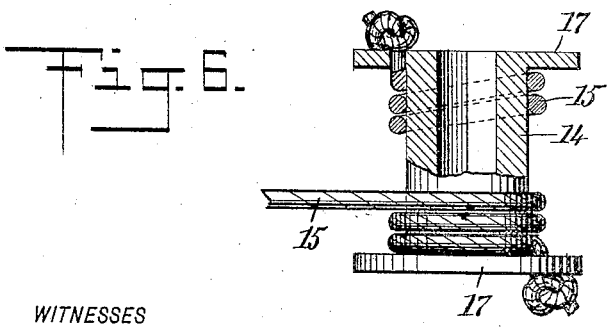

AUGUST MAUKSCH, OF NEAR TABOR, SOUTH DAKOTA; A. J. WILCOX EXECUTOR OF SAID MAUKSCH, DECEASED.

STEERING MECHANISM.

935,610.

Specification of Letters Patent. Patented Sept. 28, 1909.

Application filed November 2, 1907. Serial No. 400,317.

*To all whom it may concern:*

Be it known that I, AUGUST MAUKSCH, a citizen of the United States, and a resident of near Tabor, in the county of Yankton and State of South Dakota, have invented a new and Improved Steering Mechanism, of which the following is a full, clear, and exact description.

This invention relates to steering mechanism such as used on vehicles.

The object of the invention is to produce an improved steering mechanism which will operate effectively and which can be used with the usual steering knuckles found on automobiles, so as to bring about a greater displacement of one of the two steering wheels than the other. The purpose in doing this is to displace the wheels so that their axes of rotation will intersect in the plane of one of the hind wheels. In this way the turning of the vehicle is made to take place about that hind wheel as a center.

The invention consists in the construction and combination of parts to be more fully described hereinafter and particularly set forth in the claim.

Reference is to be had to the accompanying drawings forming a part of this specification, in which similar characters of reference indicate corresponding parts in all the figures.

Figure 1 is a plan illustrating the invention as applied to an automobile or similar vehicle; Fig. 2 is a front elevation of the parts shown in Fig. 1; this view is upon an enlarged scale, and shows only a portion of the mechanism, the portion at the right being broken away; Fig. 3 is a cross section on the line 3—3 of Fig. 1 but upon an enlarged scale, certain parts being broken away or omitted; Fig. 4 is a detail showing, in side elevation, one of the steering cams which constitutes a feature of the invention; Fig. 5 is a cross section through Fig. 4, taken on the line 5—5 and illustrating the manner of attaching the steering cords to the steering cam; Fig. 6 is a vertical section taken through a steering drum which constitutes a feature of the invention.

Referring more particularly to the parts, and especially to Figs. 1 to 6 inclusive, 1 represents the frame or chassis of the vehicle. To the forward portion of this frame steering wheels 2 are attached by knuckle joints 3; that is, the wheels are attached on knuckles 4 mounted on pivot bolts 5 between the forks 6 of the forward axle 7. These knuckles 4 are provided with rigid steering cams 8 which are of elongated elliptical form, the longitudinal axes of the ellipses being inclined toward each other in a rearward direction. The outer or side faces of the cams are grooved so as to receive a continuous cord or belt 9 which passes around the cams, and is rigidly attached thereto by a suitable fastening device 10 as illustrated in Figs. 4 and 5. The point of attachment of the fastening 10 is a matter of importance; it should be applied at substantially the point shown, that is, on the outer side of the cam and near its forward end. Its position is indicated in Fig. 5, which represents the right-hand cam, the forward end of the cam being disposed toward the lower edge of the sheet. It will be evident from this arrangement that if the right-hand knuckle is rotated toward the right, this movement will produce a rotation of the left-hand knuckle, but in a less degree; and vice versa.

Near the middle point of the vehicle frame a hand steering wheel 11 is provided, the same being rigidly attached to a steering spindle 12 which extends downwardly, as illustrated in Figs. 2 and 3; and is rotatably mounted in a suitable bracket 13 attached to the forward axle as indicated. Below the bracket 13 the spindle 12 is provided with a rigidly attached drum 14. To the forward ends of the cams 8 the ends of a draw cord 15 are attached, and this draw cord passes in coils 16 around the drum 14, the ends of the draw cord being fixed in the flanges 17 of the drum, as illustrated in Fig. 6. From this arrangement it should be understood that if the hand wheel 11 is rotated toward the right, the end of the cord 15 which extends toward the right will be paid out, while the portion of the cord at the left of the hand wheel will be taken up. In this way the steering knuckle 4 at the left of the vehicle will be rotated inwardly and in such a way as to throw the wheel into a position inclining toward the right, as indicated in dotted lines. In this way the elliptical cam 8 which is at the left, is thrown into an inclined position, which immediately throws the opposite cam at the right of the vehicle also into an inclined position. The arrangement is such, however, that the amount of movement of the left hub far exceeds that of the right one. The elliptical cams are so proportioned and placed that the wheel at the left will be displaced into the position indicated by the dotted lines; the axis of the wheel will then pass over the tread point of the right hind wheel, as indicated by the dotted line in Fig. 1. The movement of the right forward wheel is less than this, but is sufficient to place it in the position shown in the dotted lines; in this position the axis of this wheel intersects the axial line of the left wheel over the tread of the right hind wheel, as indicated. The mechanism described is used in connection with brakes 18 which are applied by means of foot levers 19 and 20 arranged near the hand wheel, the said levers being attached to independently rotatable spindles 21 and 22 which are connected through links 23 and levers 24 with the brake links 25. It should be understood that by holding either of the rear wheels against rotation by means of the brakes, that wheel will operate as a pivot around which the body of the vehicle will move in turning in either direction. In this connection it should be understood that the vehicle is propelled through the usual differential drive gearing 26. Hence the full driving force from the differential passes to the left hind wheel. As the vehicle turns, all the wheels are in planes at right angles to a radial line passing through the pivot point. Hence there is no sliding effect or skidding tending to dislocate the tires.

Having thus described my invention, I claim as new and desire to secure by Letters Patent:

In a steering mechanism, in combination, a frame, knuckles, wheels on said knuckles supporting said frame, elongated cams on said knuckles, a cord connecting said cams and wrapping upon the curved faces thereof, a central drum mounted on said frame having a steering spindle for operating the same, and a steering cord wrapped on said drum and having its ends attached to said cams.

In testimony whereof I have signed my name to this specification in the presence of two subscribing witnesses.

AUGUST MAUKSCH.

Witnesses:
 HERBERT W. WILSON,
 HANS MILLER.